Dec. 12, 1950     C. J. MORTON ET AL     2,534,142
BEARING MOUNTING
Filed July 20, 1949
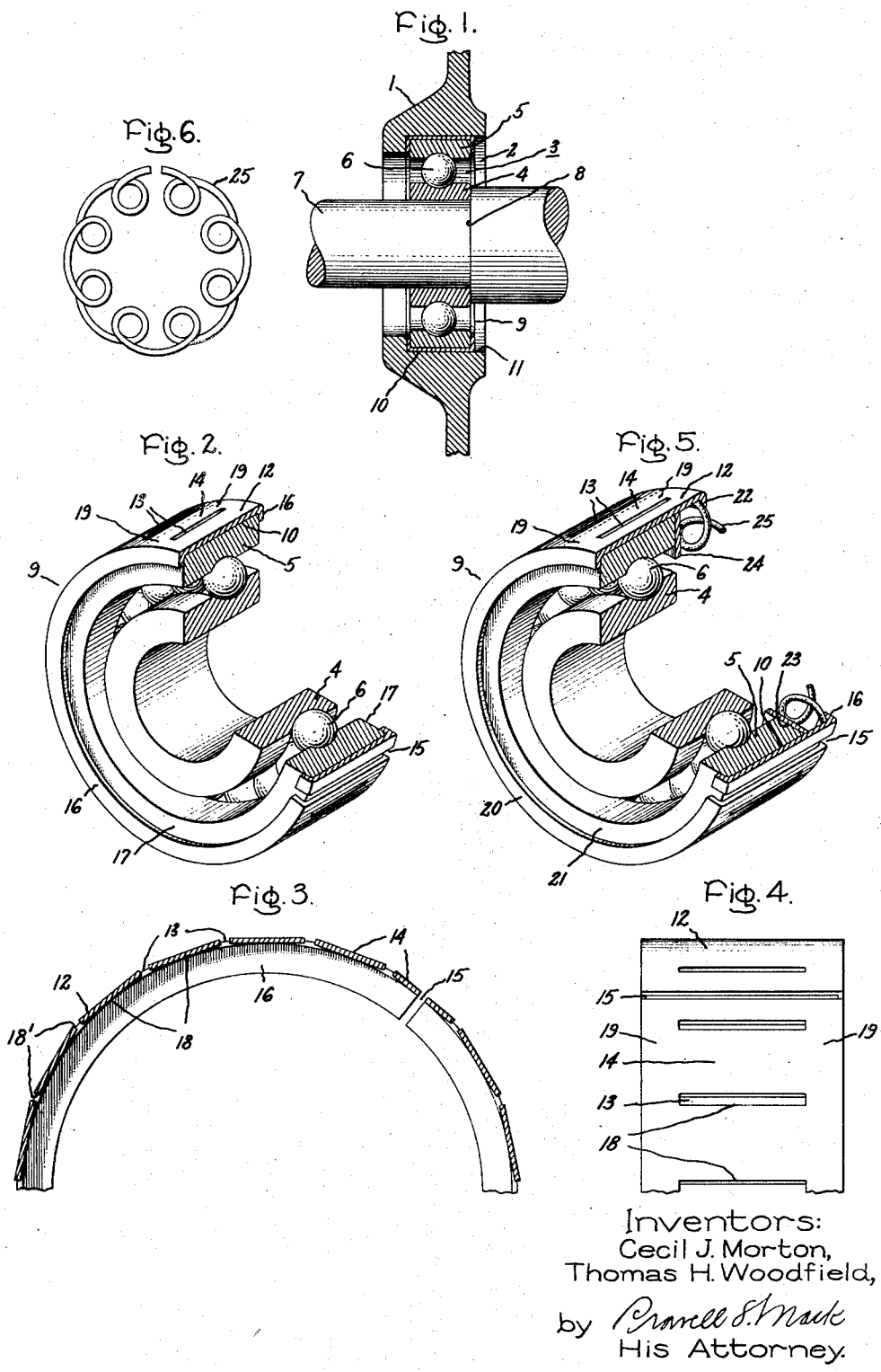
Inventors:
Cecil J. Morton,
Thomas H. Woodfield,
by His Attorney.

Patented Dec. 12, 1950

2,534,142

UNITED STATES PATENT OFFICE 2,534,142

BEARING MOUNTING

Cecil J. Morton, Coventry, and Thomas H. Woodfield, Birmingham, England, assignors to General Electric Company, a corporation of New York Application July 20, 1949, Serial No. 105,792
In Great Britain August 27, 1948

1 Claim. (Cl. 308—184)

This invention relates to mountings for bearings and more particularly to resilient mountings for anti-friction bearings to insure the requisite fit of the outer bearing race within its supporting housing.

In the construction of anti-friction bearing assemblies in which a bearing is located in a supporting structure or housing, it is desirable to provide a fit of the bearing in its housing which will not allow the bearing to creep circumferentially. This requires very close tolerances in the machining of the diameters of both the bearing and the interior of the housing and often necessitates selective assembly. It may also be desirable to provide for limited axial movement of the bearing to accommodate end play of the shaft.

An object of this invention is to provide an improved mounting for bearings.

Another object of this invention is to provide an improved mounting for bearings wherein the requisite fit is provided for the bearing within its supporting housing without requiring that the diameters of these elements be kept to close tolerances.

A further object of this invention is to provide an improved mounting for bearings wherein limited axial movement of the bearing is permitted.

Further objects and advantages of this invention will become apparent and the invention will be better understood from the following description referring to the accompanying drawings, and the features of novelty which characterize the invention will be pointed out with particularity in the claim annexed to and forming part of this specification.

In accordance with this invention, a bearing mounting is provided interposed between the outer surface of the bearing and the inner surface of the bearing housing. The bearing mounting comprises a prestressed cylindrical band of springy material with spaced apart ends arranged to snap over the bearing so as to tightly engage the outer surface thereof. The band is provided with a plurality of evenly spaced transverse slots around its circumference defining resilient segments therebetween. The segments are substantially flat with the transverse center portion of each segment engaging the outer surface of the bearing and the edges of each segment engaging the inner surface of the bearing housing so that the bearing is securely held in place. The circumferential edges of the band may be provided with annular flange portions engaging the ends of the bearing. In accordance with a modification of this invention, one annular flange portion is spaced from one end of the bearing and a spring member is interposed therebetween to cushion axial end play.

In the drawing, Fig. 1 is a side elevational view, partly in section, illustrating the improved bearing mounting of this invention; Fig. 2 is a broken away view in perspective further illustrating the bearing mounting of Fig. 1; Fig. 3 is a fragmentary cross-sectional view of the mounting member; Fig. 4 is a fragmentary side view of the mounting member of Fig. 3; Fig. 5 is a broken away view in perspective illustrating a modified form of this invention; and Fig. 6 illustrates the spring member of Fig. 5.

Referring now to Fig. 1, there is shown a bearing housing member 1 having a cavity 2 formed therein in which bearing 3 is positioned. The bearing is shown here as being of the anti-friction type comprising an inner bearing race 4, an outer bearing race 5, and anti-friction bearing elements or balls 6 interposed therebetween. The inner bearing race 4 is mounted on the shaft 7 in any suitable manner, as by a press fit, and abuts the shoulder 8 on the shaft. A bearing mounting member 9 is interposed between the outer surface 10 of the outer bearing race 5 and the inner surface 11 of the housing 2 of the bearing housing member 1, as will be hereinafter described.

Referring now to Figs. 2, 3 and 4, the bearing mounting member 9 comprises a band 12 of relatively thin springy material, such as spring steel or phosphor bronze, arranged around the outer surface 10 of the outer bearing race 5. The band 12 has a plurality of equally spaced transverse slots 13 formed therein around the circumference defining resilient segments 14 therebetween. The ends of the band 12 are spaced apart as shown at 15. The circumferential edges of the band 12 are provided with annular flange portions 16 respectively engaging the ends 17 of the outer bearing race 5.

In forming the mounting member 9, a strip of suitable material is provided and the transverse slots 13 are formed therein at regular intervals. The strip is then passed between suitable rollers to form the flange portions 16 at right angles to the main body of the strip and the strip is then bent into a cylinder of the approximate diameter of the outer bearing race 5. When bent into a cylinder, the segments 14 defined by the transverse slots 13 remain substantially flat as shown in Fig. 3, the rollers used for forming the strip into cylindrical form being relieved over the width of the slots to prevent bending the segments 14 during rolling. Thus, the mounting member 9 has a prestressed cylindrical form which adapts it to be snapped over the outer surface 10 of the outer bearing race 5. When the bearing mounting 9 is assembled on the bearing, the transverse center portions 18 of the segments 14 engage the outer surface 10 of the outer bearing race 5 and when this assembly is positioned in the cavity 2, the edges 18' of the segments 14 engage the inner surface 11 of the cavity, the end portions 19 of the band 12 which join the segments 14 being in tight engagement with the outer surface 10 of the bearing 5.

Referring now to Fig. 5 in which like elements are indicated by like reference numerals, there is shown a modification in which one circumferential edge of the band 12 is provided with an annular flange portion 20 engaging end 21 of the outer bearing race 5 and the other circumferential edge is provided with an annular flange 22 spaced from the end 23 of the outer bearing race 5. An annular washer member 24 is arranged abutting the end 23 of the outer bearing race 5 and a spring member 25 is interposed between the washer member 24 and the annular flange 22. This provides a preloaded resilient structure which will cushion axial end play of the shaft 3.

It will now be readily seen that this invention provides an improved bearing mounting which is simply and inexpensively formed and readily assembled on the bearing. The resilient action of the segments 14 permits the bearing and bearing mounting assembly to be readily inserted in the bearing housing and obviates the necessity for machining the cavity in the housing to secure the proper fit of the bearing therein.

While we have illustrated and described a particular embodiment of this invention, modifications thereof will occur to those skilled in the art. We desire it to be understood, therefore that this invention is not to be limited to the particular arrangement disclosed, and we intend in the appended claim to cover all modifications which do not depart from the spirit and scope of the invention.

What we claim as new and desire to secure by Letters Patent of the United States is:

In a bearing assembly including a bearing housing member having a cavity formed therein and a bearing positioned in said cavity, a resilient bearing mounting member arranged intermediate the outer surface of said bearing and the inner surface of said cavity for securing said bearing in said housing, said mounting member comprising a band of springy material with spaced apart ends arranged around the outer surface of said bearing, one circumferential edge of said band having an annular flange portion engaging one end of said bearing, the other circumferential edge of said band having an annular flange portion spaced from the other end of said bearing, and resilient means interposed between said last-named flange portion and said other end of said bearing for cushioning axial movement of said bearing, said band having a plurality of transverse slots formed therein defining resilient segments therebetween, said segments being substantially flat with the transverse center portion of each segment engaging the outer surface of said bearing and the edges of each segment engaging the inner surface of said cavity whereby said bearing is securely held in place.

CECIL J. MORTON.
THOMAS H. WOODFIELD.

REFERENCES CITED

The following references are of record in the file of this patent:

UNITED STATES PATENTS

| Number | Name | Date |
| --- | --- | --- |
| 1,158,726 | Salisbury | Nov. 2, 1915 |
| 1,961,323 | Almen | June 5, 1934 |
| 1,978,527 | Erickson | Oct. 30, 1934 |

FOREIGN PATENTS

| Number | Country | Date |
| --- | --- | --- |
| 7,635 | Great Britain | 1910 |